May 22, 1951  G. WEGGUM  2,554,077
MOVABLE FEED HOPPER FOR BELT CONVEYERS
Filed March 10, 1949  2 Sheets-Sheet 1
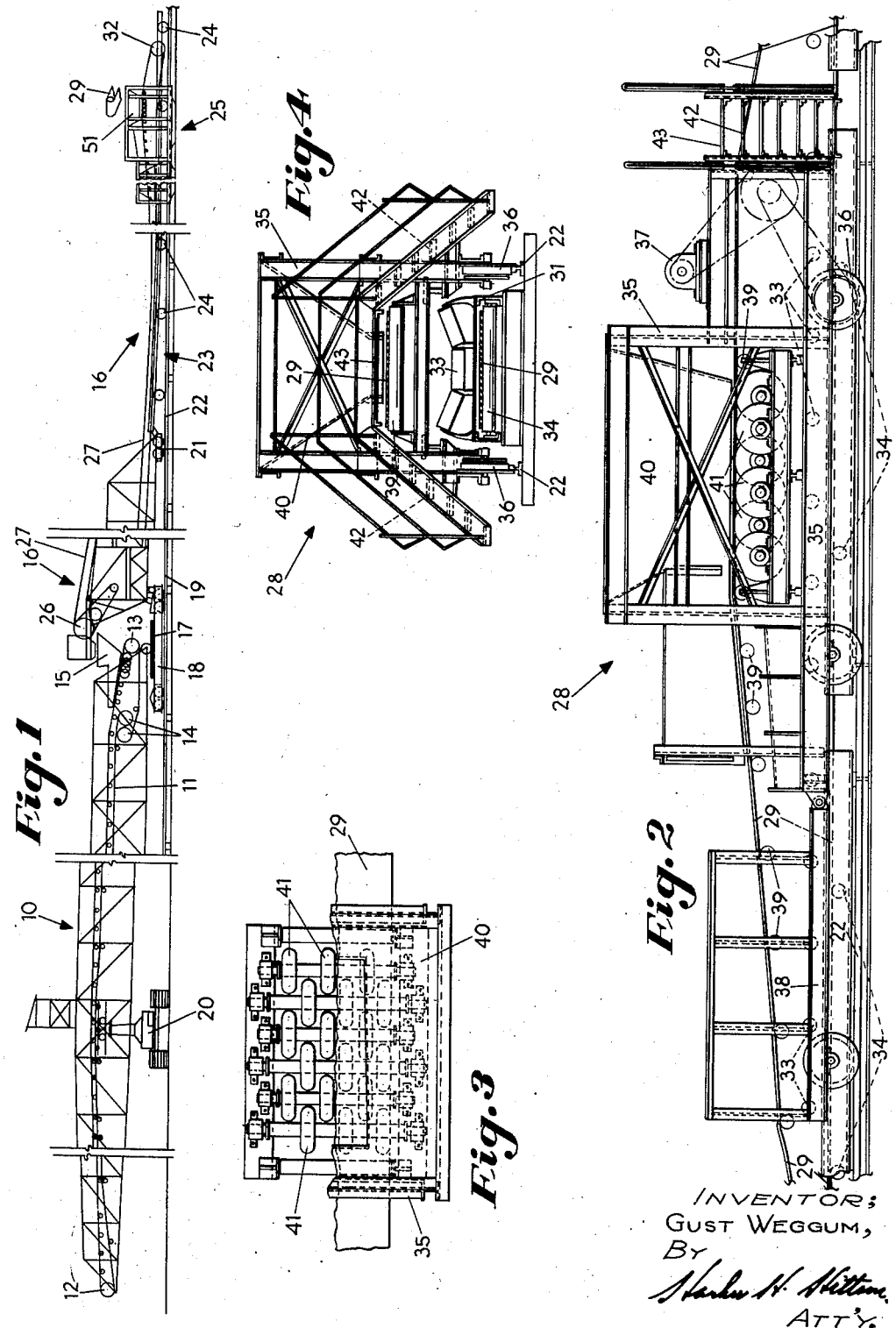
INVENTOR:
GUST WEGGUM,
BY
ATT'Y.

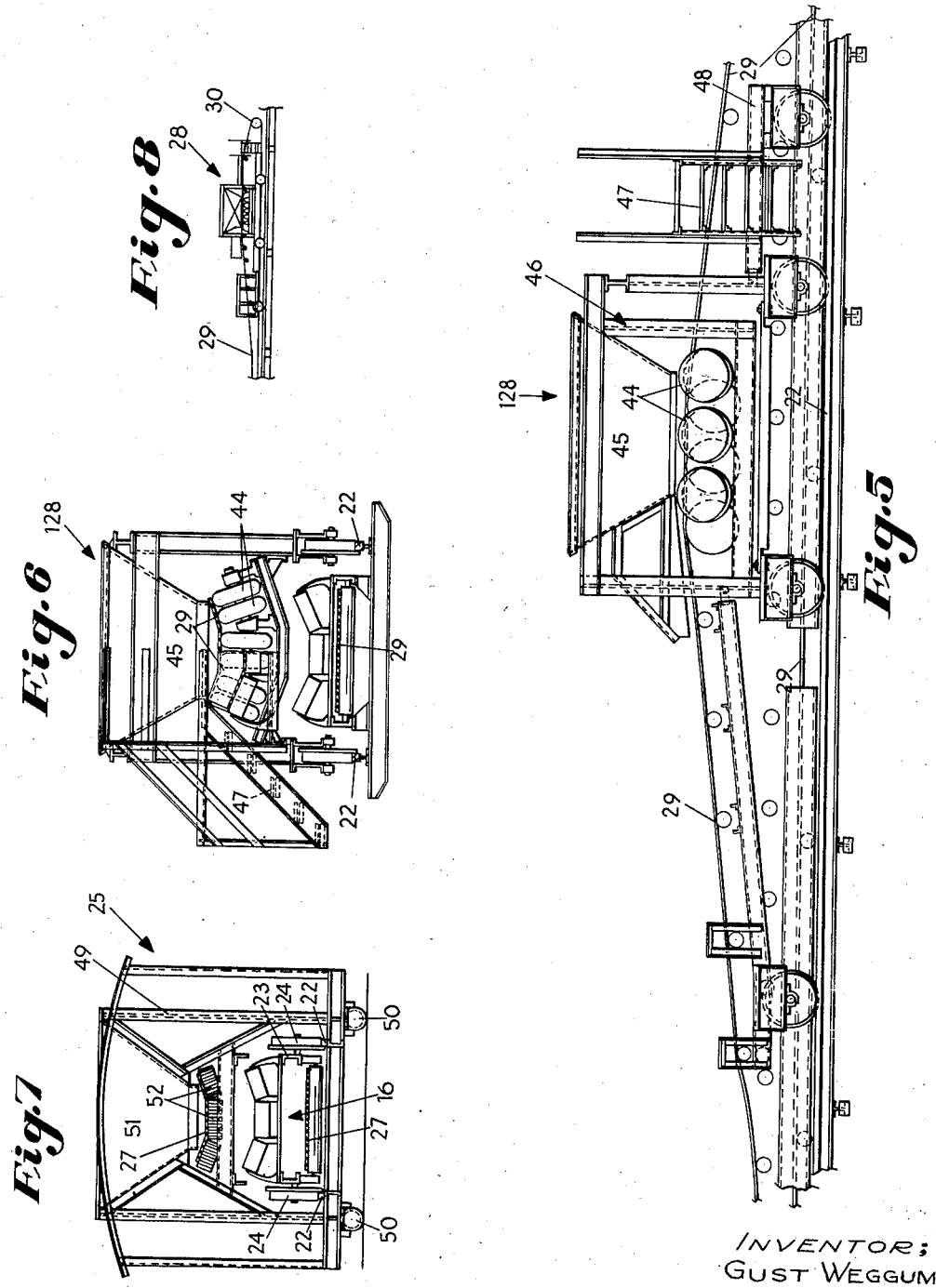

Patented May 22, 1951

2,554,077

UNITED STATES PATENT OFFICE 2,554,077

MOVABLE FEED HOPPER FOR BELT CONVEYERS

Gust Weggum, Nashwauk, Minn., assignor to The Jeffrey Manufacturing Company, a corporation of Ohio Application March 10, 1949, Serial No. 80,695

5 Claims. (Cl. 198—57)

This invention relates to a conveyer system including particularly a novel feed hopper associated with a belt conveyer, in which there is provision for relative adjustment between the feed hopper and the belt conveyer along the longitudinal axis of the latter, with means provided to effect a lifting of the belt conveyer from its normal idlers and carry it over a plurality of closely positioned cushioning idlers, which in the preferred embodiment are pneumatic cushioning idlers, which support the belt directly below the hopper and thereby take the shock of the material dumped into said hopper.

An object of the invention is to provide an arrangement of the above general class in which the hopper is movable on tracks relative to a stationary conveyer frame having an endless conveyer belt thereon.

Still another object of the invention is to provide a general arrangement, as above set forth, in which the hopper is stationary and the associated conveyer frame is mounted on tracks, or the like, and thus adjustable along its longitudinal axis relative to said feed hopper.

Other objects of the invention will appear hereinafter, the novel features and combinations being set forth in the accompanying claims.

In the accompanying drawings,

Fig. 1 is a diagrammatic side elevational view of an installation incorporating features of my invention;

Fig. 2 is an enlarged side elevational view of one form of the feed hopper, in which the hopper is longitudinally adjustable relative to a stationary conveyer;

Fig. 3 is a plan view, with parts broken away, showing particularly the mounting of the pneumatic tired cushioning idlers below the belt as it passes under the feed hopper;

Fig. 4 is an end view of the feed hopper of Fig. 2, showing the associated longitudinally extending stationary conveyer;

Fig. 5 is a side elevational view of a modified form of feed hopper;

Fig. 6 is an end view of the feed hopper of Fig. 5, showing the associated stationary conveyer, and with parts broken away;

Fig. 7 is an end view of a modified feed hopper, in which the hopper is stationary and the associated belt conveyer is provided with wheels mounted on rails and is adjustable longitudinally relative to said feed hopper. In this modification the grouped idlers directly under the hopper are not of the pneumatic tire type but are preferably rubber surfaced cushioning idlers; and Fig. 8 is a diagrammatic view of a movable feed hopper associated with the end of a belt conveyer. The feed hopper illustrated may have the form of that of Figs. 2, 3 and 4 or that of Figs. 5 and 6.

The invention here involved deals generally with the problem of handling large quantities of earth spoilage, such as the overburden of an ore vein in an open pit iron mine, or the handling of dirt, gravel, and the like, in connection with any large excavation of the type above mentioned, or in dealing with the overburden in an open pit coal mine, the construction of dams and causeways, and the like.

As illustrated in Fig. 1 of the drawings, the conveyer system includes a large stacker or discharge boom 10 which includes an endless conveyer belt 11 which extends between a head or discharge pulley 12 and a tail pulley 13, being reeved about drive pulleys 14. The rear end of the stacker 10 is provided with a feed hopper which receives material from a feeding or trailing conveyer 16. The rear end of the stacker 10 is mounted for swinging adjustment about an upright axis on a turntable 17 carried by a track mounted truck 18 adapted to run on tracks or rails 19. At substantially its center of gravity, preferably slightly forward thereof, the stacker 10 is mounted on a tractor 20.

The front end of the feeding or trailing conveyer 16 includes a head frame, the front of which is mounted on the truck 18, and the rear end of which is mounted upon a truck 21 adapted to ride upon rails 22 which may be of lesser gauge than the rails 19. The feeding conveyer 16 also includes a trailing frame portion 23 which is provided with wheels 24 which travel upon the rails 22. Said trailing frame portion 23 of the conveyer 16 extends through and beyond a feed hopper, designated generally by the reference character 25, and extends to a tail pulley 32.

Extending throughout the trailing conveyer 16 and over the tail pulley 32 at the rear end, and a head pulley 26 at its forward end there is an endless conveyer belt 27 mounted upon either flat or troughing idlers carried by said trailing frame portion 23 as well as the fabricated frame portion of the said feeding conveyer 16. The general arrangement is claimed in my divisional application Serial No. 141,632, filed February 1, 1950.

In Fig. 8 of the drawings there is illustrated a different arrangement of a feed hopper and associated belt conveyer which may be used in a situation in which no longitudinal feeding of the belt conveyer is required, but in which the feed position of the hopper is to be adjusted. This feed hopper is designated in general by the reference character 28 and is associated with a belt conveyer including an endless belt 29 having a head pulley, not shown, and a tail pulley 30 and including a stationary frame 31, seen in Fig. 4 of the drawings, which carries conventional troughing upper run idler assemblies 33 and flat lower or return run belt supporting idlers 34.

The detailed construction of the adjustable or movable feed hopper 28 of Fig. 8 of the drawings in one form is illustrated in Figs. 2, 3 and 4 of the drawings, to which attention is particularly directed. Said adjustable or movable feed hopper 28 includes a main truck or frame 35 having forward and rearward pairs of track engaging wheels 36 adapted to ride on the tracks or rails 22. One pair of said wheels 36 may be power driven from a motor 37 through appropriate drive gearing, whereby the position of the adjustable feed hopper 28 may be adjusted along the length or longitudinal axis of the associated stationary conveyer 29—33.

Forward of the truck or frame 35 there is a portable two-wheel cart-like truck 38 which is pivotally attached to the truck 35 on a horizontal axis and which in effect constitutes an extension thereof. The truck 35 and truck 38 carry a plurality of idlers 39 which progressively raise and thereafter progressively lower the upper run of the belt 29 to and from a belt loading position immediately below a hopper 40 where the belt 29 is loaded with material.

By reference particularly to Figs. 2 and 4 of the drawings it is, of course, evident that the idlers 39 are effective to lift the belt 29 from the idlers 33 of the trailing conveyer 29—33, as said upper run of belt 29 passes through the truck 35 and truck 38, or, in other words, as it comes up to and leaves the loading position and while at said loading position. After the belt 29 is loaded with material it is gradually lowered by the idlers 39 until it is again received by the idlers 33 of the associated longitudinally extending stationary conveyer 29—33.

To protect the belt 29 during the loading operation, as well as other machinery, there is a nest, plurality, or group of closely associated idlers 41 mounted on appropriate shafts and carried by the truck 35 located directly below the discharge opening in the bottom of the hopper 40. These idlers 41 are preferably provided with pneumatic tires and constitute, per se, a well known type of belt supporting loading idler.

The truck 35 also is preferably provided with a pair of stairs 42 leading to an observation or operator's platform 43 adjacent the hopper 40.

In Figs. 5 and 6 of the drawings there is illustrated a modified form of movable or adjustable feed hopper designated 128. In its essential characteristics the movable feed hopper 128 follows the feed hopper 28 above described. It differs, however, in certain details which are obvious from an inspection of the drawings, some of which will be mentioned.

In place of the pneumatic tires 41 which provide a plane surface support for the belt 29 while being loaded, pneumatic tires 44, which have the same function as the tires 41, are provided, but provide a troughing of the belt 29 while it is loaded from an associated hopper 45.

The truck 46 has been simplified somewhat, as compared with the truck 35. A ladder 47 leading to an observation platform is provided on a sub-truck 48 attached to the truck 46.

In Fig. 7 of the drawings there is illustrated the construction of the feed hopper 25 in one form thereof, said feed hopper 25 being, of course, illustrated at the right hand end of the conveyer assembly in Fig. 1 of the drawings. Said feed hopper 25 includes a main frame 49 which is mounted on a pair of skids 50 and adapted to rest upon the ground.

The feed hopper 25 is to be understood as following very closely the construction of the movable feed hopper 28, except for the fact that it is provided with stationary skids instead of the wheels 36. Also the frame 49 provides support for the rails 22 upon which the traveling conveyer 16 moves longitudinally along its own axis relative to the feeding hopper 25. In other words, the essential difference between the feed hoppers 25 and 28 is that feed hopper 25 is relatively stationary and the conveyer 16 moves relatively thereto along its longitudinal axis, while movable feed hopper 28 moves along the longitudinal axis of the relatively stationary associated conveyer 29—33. The detailed parts of the two may be substantially identical except for the differences indicated. However, instead of the pneumatic tires below the hopper 51 of the feed hopper 25 there is illustrated a rubber covered type of cushioning idler which, for example, may follow the construction disclosed in the application of Stanley M. Mercier, Serial No. 740,013, filed April 8, 1947, or Patent No. 2,169,624 to Charles R. Weiss et al., dated August 15, 1939.

It is, of course, to be understood that, if desired, pneumatic tires may be employed with the hopper 25 and, conversely, the rubber covered cushioning idlers may be employed with the hopper 28 or 128. Rubber covered cushioning idlers are seen at 52 in Fig. 7 of the drawings and they are preferably positioned close together, as clearly suggested in Fig. 1 of the drawings, so as to provide adequate support and cushioning of the belt 29 adjacent the hopper 51.

In the operation of that portion of the conveyer system and stacker illustrated in Fig. 1 of the drawings it is evident that as the stacker 10 successively swings about an upright axis in a generally horizontal plane, discharging material over the head pulley 12, it is progressively or generally continuously fed forward, this being permitted by the truck 18 and the trailing conveyer 16. All this time the position of the feed hopper 25 is fixed, while the conveyer 16 is free to move back and forth or longitudinally along its axis relative thereto. At all times the upper run of the belt 27 is lifted from the idlers of the conveyer 16 adjacent the feed hopper 25 and supported on cushioning idlers either of the pneumatic or solid rubber covered type, while the belt is receiving material.

The system may further include a belt conveyer 29—33 which is relatively fixed and discharges into the hopper 51 of the stationary hopper 25. It may be desirable to have a movable feed hopper associated with said stationary conveyer 29—33 and such an arrangement is illustrated in one form in Figs. 2 to 4 of the drawings and in another form in Figs. 5 and 6 of the drawings.

The general arrangement of such a movable feed hopper in association with the belt 29 is illustrated in Fig. 8 of the drawings. In this arrangement the conveyer 29—33, being stationary, the associated movable feed hopper 28, or 128, as the case may be, is adjustable along the longitudinal axis of the conveyer 29—33 by virtue of the portable mounting thereof. This makes it possible to adjust the feed position of the conveyer 29—33 without requiring an excessive number of cushioning idlers in association with the upper run, while insuring the presence of such cushioning idlers in association with said upper run at any position where it is desirable to feed material to said belt conveyor 29—33.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. In combination, conveyor mechanism including a conveyer frame, a flexible endless material carrying belt, means for supporting said belt including idlers carried by said frame, a loading hopper for loading said belt, frame means supporting said hopper above said conveyer frame and said idlers for movement along said belt and over said frame and idlers, loading idler means adjacent said hopper positioned above the aforementioned idlers, said belt extending above and free of said first named idlers and being carried by said loading idler means when adjacent said hopper, and means for adjusting the position of said loading hopper relative to said conveyer along the longitudinal axis of the conveyer including wheel and truck means for shifting said hopper.

2. In combination, conveyer mechanism including a conveyer frame, a flexible endless material carrying belt, means for supporting said belt including idlers carried by said frame, a loading hopper for loading said belt, means supporting said hopper above said conveyer frame and said idlers whereby relative movement is provided between said conveyer mechanism and said hopper along the axis of said conveyer, loading idler means adjacent said hopper positioned above the aforementioned idlers, said belt extending above and free of said first named idlers and being carried by said loading idler means when adjacent said hopper, and means for adjusting the position of said loading hopper relative to said conveyer along the longitudinal axis of the conveyer.

3. In combination, conveyer mechanism including a conveyer frame, a flexible endless material carrying belt, means for supporting said belt including idlers carried by said frame, a loading hopper for loading said belt, means supporting said hopper above said conveyer frame and said idlers, loading idler means adjacent said hopper positioned above the aforementioned idlers, said belt extending above and free of said first named idlers and being carried by said loading idler means when adjacent said hopper, and means for adjusting the relative position of said loading hopper and said conveyer along the longitudinal axis of the conveyer including wheel and truck means for shifting said conveyer.

4. In combination, conveyer mechanism including a conveyer having a flexible endless material carrying belt, means for supporting said belt including idlers, a loading hopper for loading said belt, and loading idler means adjacent said hopper positioned above the aforementioned idlers, said belt extending above and free of said first named idlers and being carried by said loading idler means when adjacent said hopper.

5. In combination, a conveyer including a frame and a belt supported thereby, a feed hopper frame positioned above and adjacent said conveyer frame through which said belt extends, means supporting said feed hopper frame independently of said conveyer frame, and belt supporting means carried by said hopper frame, said conveyer belt being supported by said hopper frame belt supporting means as it passes through said hopper frame.

GUST WEGGUM.

REFERENCES CITED

The following references are of record in the file of this patent:

UNITED STATES PATENTS

| Number | Name | Date |
| --- | --- | --- |
| 785,569 | Plunket | Mar. 21, 1905 |
| 1,044,547 | Liggett | Nov. 19, 1912 |
| 1,272,425 | Guthrie | July 16, 1918 |
| 1,636,986 | Caldwell | July 26, 1927 |
| 1,809,200 | Guille | June 9, 1931 |
| 1,883,054 | Stanley | Oct. 18, 1932 |
| 2,243,538 | Salfisberg | May 27, 1941 |
| 2,304,419 | Pratt | Dec. 8, 1942 |